(12) United States Patent
Chung et al.

(10) Patent No.: US 8,807,501 B2
(45) Date of Patent: Aug. 19, 2014

(54) WALL-MOUNTABLE HOLDER

(75) Inventors: Brian Hyuk Joon Chung, Oakbrook Terrace, IL (US); Craig Joseph Zurko, Bolingbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/534,872

(22) Filed: Jun. 27, 2012

(65) Prior Publication Data

US 2014/0001328 A1  Jan. 2, 2014

(51) Int. Cl.
*A47F 5/08*  (2006.01)

(52) U.S. Cl.
USPC ............. 248/231.91; 248/309.1; 248/176.1; 248/68.1; 211/87.01; 211/70.8

(58) Field of Classification Search
USPC ......... 248/235, 250, 247, 248, 249, 300, 301, 248/304, 309.1, 176.1, 110, 220.21, 222.51, 248/222.52, 224.8, 222.41, 223.21, 303, 248/307, 305, 296.1, 297.21, 291.1, 560, 248/316.1, 316.7, 74.1, 74.2, 68.1; 211/87.01, 100, 193, 70.6, 65, 66, 211/70.5, 70.8, 63, 40, 51
See application file for complete search history.

(56) References Cited

U.S. PATENT DOCUMENTS

| | | | | |
|---|---|---|---|---|
| 307,761 A | * | 11/1884 | Harger | 248/113 |
| 325,196 A | * | 8/1885 | Caldwell | 211/87.01 |
| 622,226 A | * | 4/1899 | Homan | 248/316.7 |
| 825,332 A | * | 7/1906 | Mack | 248/113 |
| 861,814 A | * | 7/1907 | Crain | 248/110 |
| 1,440,900 A | * | 1/1923 | Andreasen | 248/113 |
| 1,703,872 A | * | 3/1929 | Engelson | 211/85.3 |
| 1,937,424 A | * | 11/1933 | Champlin | 248/37.6 |
| 1,997,490 A | * | 4/1935 | Hoar | 211/89.01 |
| 2,051,408 A | * | 8/1936 | Karst | 211/65 |
| D150,507 S | * | 8/1948 | McEntire | D6/526 |
| 2,541,349 A | * | 2/1951 | Gamache | 211/89.01 |
| 2,577,988 A | * | 12/1951 | Wirth | 211/70.6 |

(Continued)

OTHER PUBLICATIONS

Gladiator GarageWorks GAGPUB2PPY Geartrack Pack for Garages, available at http://www.amazon.com/Gladiator-GarageWorks-GAGPUB2PPY-Geartrack-Garages/dp/B000KHPFEO/ref=sr_1_7?s=hi&ie=UTF8&qid=1333669469&sr=1-7, last visited May 30, 2012.

(Continued)

*Primary Examiner* — Kimberly Wood
(74) *Attorney, Agent, or Firm* — Mark W. Croll; Maurice E. Finnegan, III; Beem Patent Law Firm

(57) ABSTRACT

A wall mountable holder may include a base portion, a first arm, and a second arm extending outward from the base, where each of the arms may extend to a distal end spaced away from the base. Additionally, the holder may include at least one groove extending downwardly from an upper edge of at least one of the arms. The holder also may include a tab extending inward at a distal end of at least one of the arms, the tab including a leading surface angled inward and rearward from proximate the distal end, and a trailing surface angled outward and rearward from the leading surface. An opening may be formed between the arms, proximate the distal ends, such that the opening may be narrower than a spacing between the arms at each point between the base and the opening.

7 Claims, 2 Drawing Sheets

(56) References Cited

U.S. PATENT DOCUMENTS

| | | | | |
|---|---|---|---|---|
| 2,766,958 A | * | 10/1956 | Levy | 248/220.41 |
| 3,291,427 A | * | 12/1966 | Hutchings | 248/201 |
| 3,677,415 A | | 7/1972 | Radek | |
| 3,721,348 A | * | 3/1973 | Cook | 211/70.6 |
| 3,746,294 A | * | 7/1973 | Johnston | 248/219.4 |
| 3,837,477 A | * | 9/1974 | Boudreau | 206/376 |
| 4,049,226 A | * | 9/1977 | Harvey | 248/248 |
| 4,465,268 A | * | 8/1984 | Hudson | 269/99 |
| 4,534,471 A | * | 8/1985 | Zahn et al. | 211/39 |
| 4,863,081 A | * | 9/1989 | Gabbert | 224/550 |
| 5,224,609 A | * | 7/1993 | Bauer et al. | 211/65 |
| 5,346,063 A | * | 9/1994 | Chow | 206/376 |
| 5,505,316 A | * | 4/1996 | Lee | 211/70.6 |
| 5,876,000 A | * | 3/1999 | Ismert | 248/65 |
| 5,906,304 A | * | 5/1999 | Baldacchino | 224/406 |
| 6,003,691 A | * | 12/1999 | Owen | 211/65 |
| 6,041,947 A | * | 3/2000 | Heneveld | 211/70.6 |
| 6,216,986 B1 | * | 4/2001 | Kwilosz | 248/74.1 |
| 6,315,121 B1 | * | 11/2001 | Hansen | 206/376 |
| 6,504,100 B2 | * | 1/2003 | Lawrence et al. | 174/100 |
| 6,575,311 B1 | * | 6/2003 | Fink | 211/70.2 |
| 6,708,931 B2 | * | 3/2004 | Miura | 248/68.1 |
| 7,089,710 B2 | * | 8/2006 | Nicholson | 52/698 |
| 7,172,161 B2 | * | 2/2007 | Rosemann et al. | 248/68.1 |
| 7,490,727 B2 | * | 2/2009 | Spiers et al. | 211/89.01 |
| 7,497,059 B2 | * | 3/2009 | Bennett | 52/677 |
| 7,661,917 B2 | * | 2/2010 | Horvath et al. | 411/400 |
| 7,694,917 B2 | * | 4/2010 | Gabriel | 248/49 |
| 8,011,520 B2 | * | 9/2011 | Spiers et al. | 211/89.01 |
| 8,011,630 B1 | * | 9/2011 | Metcalf | 248/231.81 |
| 8,272,610 B2 | * | 9/2012 | Ernst et al. | 248/304 |
| 2002/0121491 A1 | * | 9/2002 | Ernst | 211/70.6 |
| 2004/0262462 A1 | * | 12/2004 | Polak et al. | 248/74.1 |
| 2006/0102820 A1 | * | 5/2006 | Boville | 248/300 |
| 2006/0226321 A1 | * | 10/2006 | Tracy | 248/301 |
| 2010/0090074 A1 | * | 4/2010 | Horvath et al. | 248/217.4 |
| 2012/0006777 A1 | * | 1/2012 | Schiller | 211/85.15 |

OTHER PUBLICATIONS

OXO Good Grips Heavy Duty Wall-Mounted Organizer, available at http://www.amazon.com/Good-Grips-Heavy-Wall-Mounted-Organizer/dp/B003DKKNBK/ref=sr_1_33?s=hi&ie=UTF8&qid=1333669491&sr=1-33, last visited May 30, 2012.

Rubbermaid 8 pc fast track garage organization kit, available at http://www.amazon.com/Rubbermaid-fast-track-garage-organization/dp/B004WAPOK0/ref=sr_1_70?s=hi&ie=UTF8&qid=1333669507&sr=1-70, last visited May 30, 2012.

Gladiator GarageWorks GAWEXXDHSH Deep Hook, available at http://www.amazon.com/Gladiator-GarageWorks-GAWEXXDHSH-Deep-Hook/dp/B000Q37V44/ref=sr_1_94?s=hi&ie=UTF8&qid=1333669522&sr=1-94, last visited May 30, 2012.

Schulte 7115-5613-50 Big Work Hook, Granite Gray, available at http://www.amazon.com/SCHULTE-7115-5613-50-Work-Hook-Granite/dp/B000P0KMC6/ref=sr_1_101?s=hi&ie=UTF8&qid=1333669539&sr=1-101, last visited May 30, 2012.

* cited by examiner

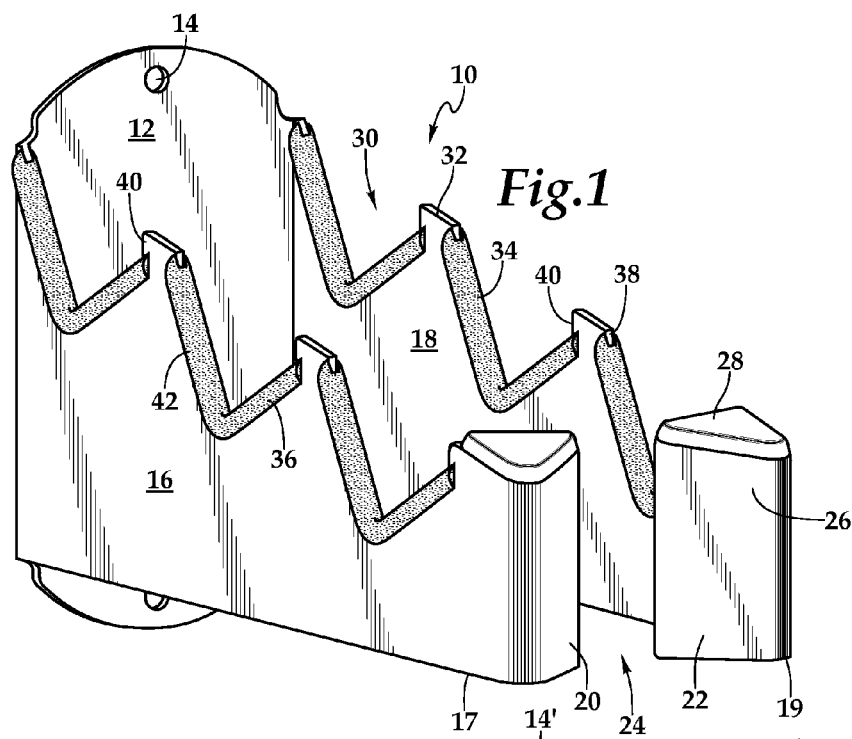
Fig.1
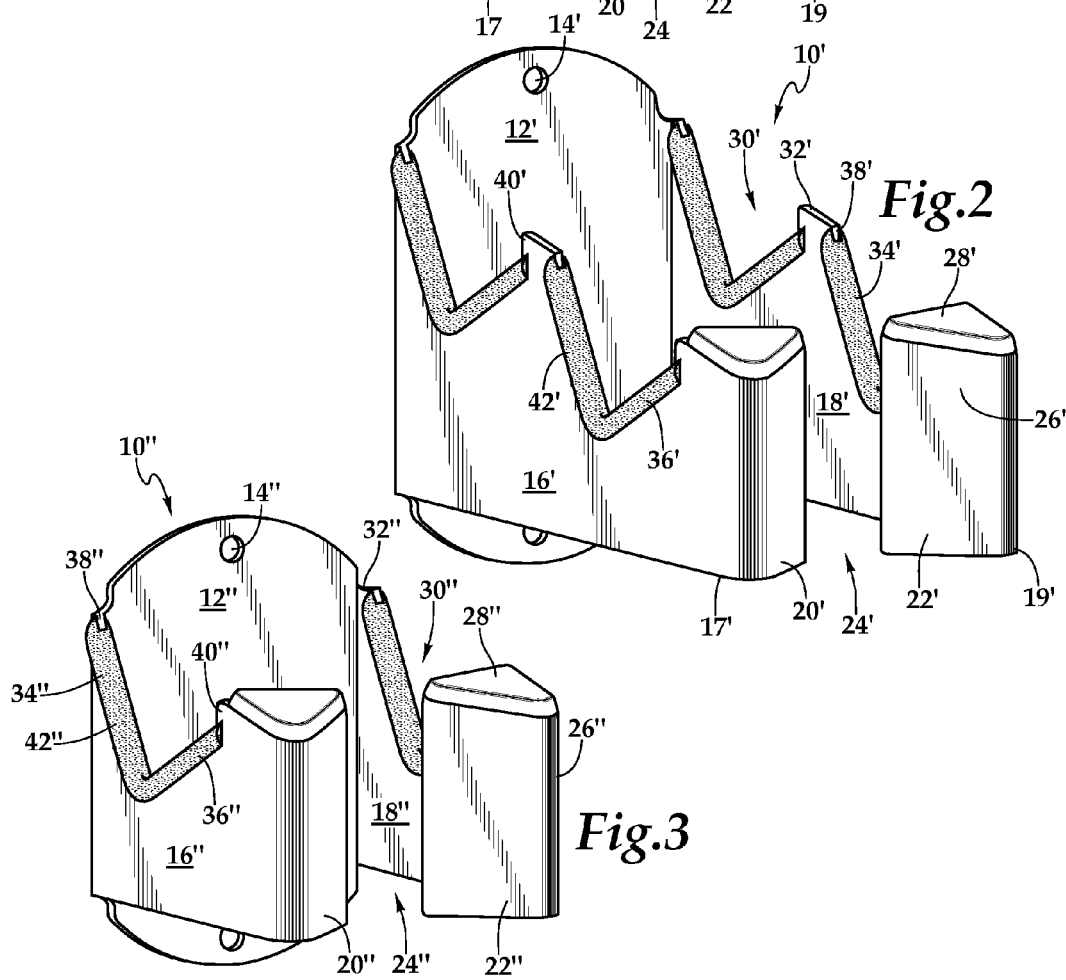
Fig.2
Fig.3

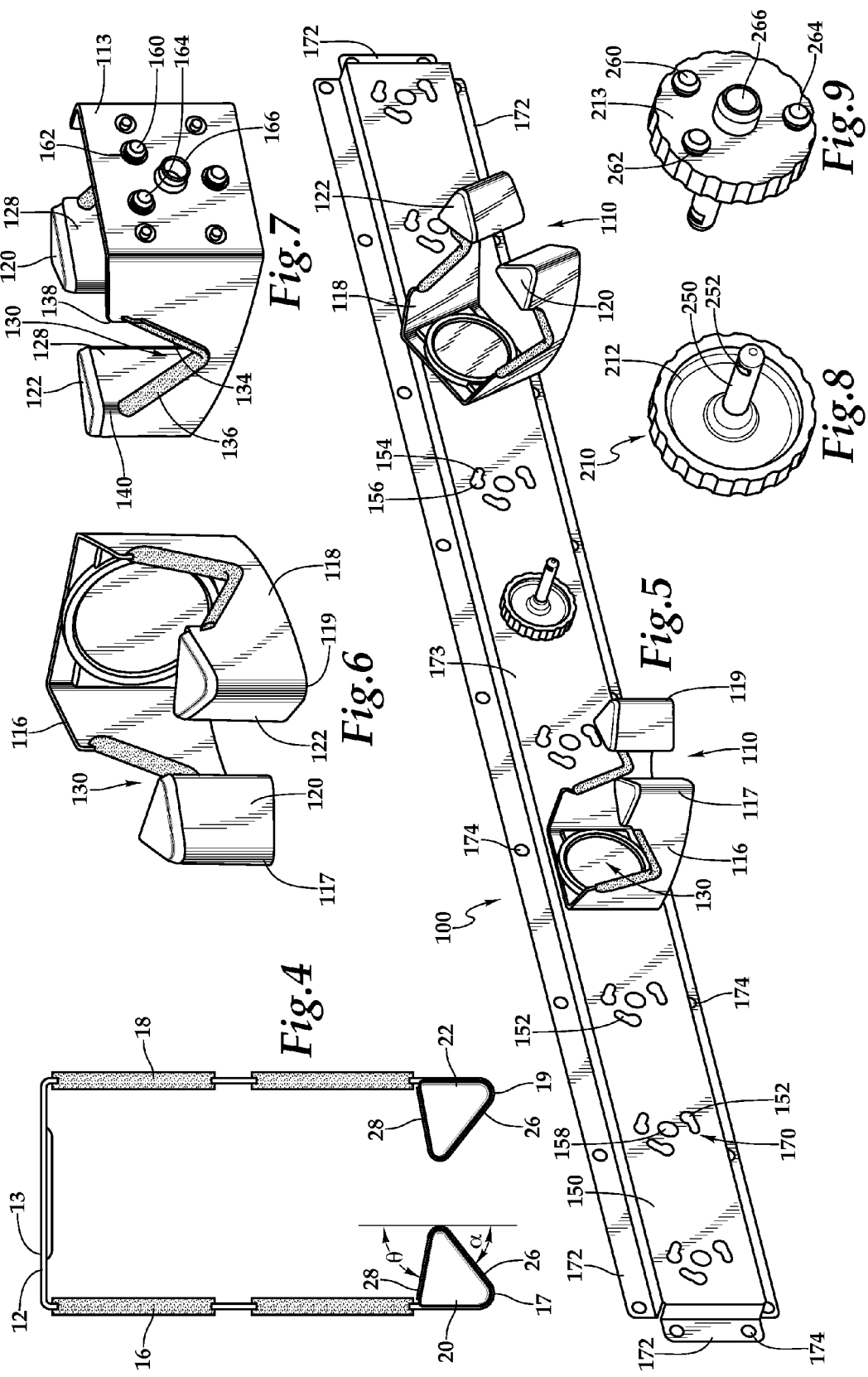

WALL-MOUNTABLE HOLDER

BACKGROUND

Storage hooks for holding various objects come in myriad sizes and shapes. Oftentimes, objects on these hooks may not be stored stably, such that dislodging the object may cause it to fall down and/or forward, which may result in damage to objects on the ground near the hooks. For example, hooks mounted in a garage for holding objects like shovels, rakes, etc., may be placed near vehicles parked in the garage. If a person accidentally dislodges the object when walking past or when parking the vehicle, the object may fall onto the vehicle, causing damage to it.

Additionally, it may be desirable to store multiple objects in a single location in order to maximize space efficiency. As such, a user may be tempted to stack those objects together, but that may make it more difficult for the user to locate the desired object easily. Stacking multiple objects on a single hook also may decrease the degree of stability with which one or more of the objects is held, increasing the likelihood that those objects may be dislodged or otherwise fall.

There are various storage solutions for supporting multiple hooks or other types of holders, such as peg board, slot wall, and other rail-type holding systems. While these systems permit a user to mount multiple hooks, the hooks often are not stored securely. These hooks may be dislodged easily, which again may cause objects stored on hooks to fall and also may require that the user expend additional time and effort in remounting and/or adjusting hooks. These types of storage systems also may require the use of large mounting backings, eliminating the use of wall space for other purposes.

What is needed is a storage solution that addresses the problems of the prior art.

SUMMARY

In one aspect, a wall mountable holder may include a base portion, a first arm, and a second arm extending outward from the base, where each of the arms may extend to a distal end spaced away from the base. The holder also may include a tab extending inward at a distal end of at least one of the arms, the tab including a leading surface angled inward and rearward from proximate the distal end, and a trailing surface angled outward and rearward from the leading surface. Additionally, the holder may include at least one groove extending downwardly from an upper edge of at least one of the arms.

A plane extending perpendicularly away from the base portion may form a first angle with respect to the leading surface and a second angle with respect to the trailing surface, and the first angle may be smaller than the second angle. In addition, the holder may be substantially symmetrical about a central plane.

Upper edges of the holder arms may be angled downwardly from the base portion towards the distal ends, and the grooves may include a first surface angled downward from proximate the upper edge and a second surface angled upward from the first surface in such a configuration that the first and second surfaces may be generally perpendicular to one another. Moreover, the grooves may include an additional surface between the second surface and the upper edge, the additional surface generally parallel to the base portion.

In another aspect, a wall mountable holder may include a base portion and first and second arms extending outward from the base, each of the arms extending to a distal end spaced away from the base. An opening may be formed between the arms, proximate the distal ends, such that the opening may be narrower than a spacing between the arms at each point between the base and the opening.

The base portion may include a plurality of openings disposed along a centerline. The arms may be substantially planar, and each arm may have an upper surface angled downward from the base portion toward the distal ends and at least one notch extending downward from the upper surface. In addition each arm may include a plurality of notches extending downward from a respective upper surface.

The holder may include a tab extending inward from each arm at the distal ends, each tab including a leading face angled inward and rearward from its respective arm, and a trailing face angled outward and rearward from a respective leading face.

In still another aspect, a wall mountable holder may include a base portion, a first arm and a second arm extending away from the base, a first tab proximate the distal end of the first arm, and a second tab proximate the distal end of the second arm, the tabs extending inward towards one another to form an opening.

Each arm may extend to a distal end spaced away from the base. Each arm may have an upper edge angled downward toward the distal end. Each arm further may include at least one groove extending downward from the upper edge, the at least one groove including a first surface and a second surface. Each tab may include a leading face between an outer surface of a respective arm and the opening, and a trailing face between an inner surface of a respective arm and the opening.

The holder also may include a plurality of grooves extending downward from the upper edge of each arm, and each groove may be substantially V-shaped. The holder additionally may include a lip extending along substantially all of at least one groove on each arm, each lip being wider than a thickness of its respective arm. Moreover, the arms may be configured to flex outward when an object contacts and moves past the first and second tabs.

These and other features and advantages are evident from the following description, with reference to the accompanying drawings.

BRIEF DESCRIPTION OF THE DRAWINGS

FIG. 1 is a perspective view of one embodiment of a holder.

FIG. 2 is a perspective view of a second embodiment of a holder.

FIG. 3 is a perspective view of a third embodiment of a holder.

FIG. 4 is a top view of the holder of FIG. 2.

FIG. 5 is a perspective view of one embodiment of a holder system.

FIG. 6 is a perspective view of one embodiment of a holder used with the system of FIG. 5.

FIG. 7 is a reverse, perspective view of the holder of FIG. 6.

FIG. 8 is a perspective view of another embodiment of a holder used with the system of FIG. 5.

FIG. 9 is a reverse, perspective view of the holder of FIG. 8.

DETAILED DESCRIPTION

In one aspect, a holder 10 may comprise a base portion 12 configured to be disposed against a mounting surface such as a base plate or a wall surface. Base portion 12 may have a substantially planar rear surface 13, and rear surface 13 may be configured to permit base portion 12 to rest substantially flush against the mounting surface.

Base portion 12 may include a plurality of openings 14 configured to receive a plurality of mounting supports. Mounting supports may comprise fasteners (e.g., wood screws), tabs, brads, nails, or other protrusions extending rearward from base portion. Alternatively, mounting supports may be integral with base portion 12 and may extend from base portion 12 without the need for openings to receive them.

Openings may be disposed at various locations on base portion 12. In one embodiment, base portion 12 may include at least one opening disposed on a centerline of holder 10. Additionally or alternatively, at least one opening may be disposed above each of the load bearing surfaces of holder 10, which may increase the shear component of loading on holder 10 and on fasteners supporting holder. Openings 14 preferably are disposed above and below arms (discussed below), with sufficient clearance such that arms do not cause interference with a fastener driving tool such as a screwdriver.

As seen in FIG. 1, holder also may include a first arm 16 and a second arm 18 extending away from base portion 12. Holder 10 may be substantially symmetrical about a central plane, such that arms 16, 18 may be substantially mirror-images of one another. As such, details described below with respect to one arm may apply similarly to the other arm.

Arm 16 may extend forward from base portion 12 towards a distal end 17. Arm 16 may be generally planar and generally perpendicular to base portion, such that arms 16, 18 may be generally equally spaced from one another along their lengths. Alternatively, arm 16 may be generally planar but may extend at an acute or obtuse angle with respect to base portion 12, such that spacing between arms may vary along the length of holder 10. For example, arms 16, 18 may be angled inward so that distal ends 17, 19 are more closely spaced than portions of arms proximate base portion 12, which may provide greater stability for objects placed on holder proximate base portion. In still another aspect, arm 16 may have a curved or other arcuate shape, which may provide for increased width between arms in the area between base portion 12 and distal end 17 of arm. In yet another aspect, arm 6 may have another shape, e.g., a series or generally planar surfaces or one or more arcuate surfaces.

Staying with FIG. 1, hook 10 may include a first tab 20 extending inward at distal end 17 of arm 16. Hook 10 also may include a second tab 22 extending inward at distal end 19 of second arm 18. As such, opening 24 may be formed proximate distal ends, e.g., between tabs 20, 22. Opening 24 may be between about 0 inches and about 2½ inches, preferably between about ½ inch and about 1½ inches, and in one embodiment, about ¾ inches.

Holder 10 may be configured to support pole-supported tools such as brooms, rakes, shovels, etc., which may include poles of varying sizes. Opening 24 may be deformable, i.e., one or more of arms 16, 18 and/or tabs 20, 22 may flex outwardly to receive these varying items. Similarly, once retained within holder, opening 24 may return to an original state, preventing objects from passing inadvertently through opening 24. For example, in one embodiment, opening 24 may be configured to accept poles having diameters between about ¾" and about 1½", although variations to allow holder to accept larger and/or smaller items may be made easily.

Tabs 20, 22, like arms 16, 18 may be substantial mirror-images of one another, such that deformation of opening 24 may be caused by movement of both tabs. Alternatively, one of the tabs may be more rigid than the other, causing deformation to occur via movement of the other tab. FIG. 1 shows an embodiment in which tabs 20, 22 are mirror images. It will be appreciated that the description of tab 20 that follows should apply similarly to tab 22 in this embodiment.

Tab 20 may include a leading surface 26 and trailing surface 28. Surfaces 26 and 28 may be substantially planar and may be disposed at some angle other than generally perpendicular with respect to a central plane. Turning to FIG. 4, an entry angle, $\alpha$, may be measured between leading surface 26 and a plane parallel to the central plane. Similarly, an exit angle, $\ominus$, may be measured between trailing surface 28 and the plane parallel to the central plane. As seen in FIG. 4, both the entry and exit angles preferably are acute.

Entry angle, $\alpha$, may be gradual, e.g., between about 15 degrees and about 75 degrees, preferably between about 31 degrees and about 52 degrees, and in the embodiment of FIG. 4, about 39 degrees. This gradual entry angle may permit a long-handle or larger-diameter tool to be inserted more easily and with less resistance into opening 24.

Conversely, exit angle, $\ominus$, may be more severe, e.g., between about 45 degrees and about 90 degrees, preferably between about 52 degrees and about 88 degrees, and in the embodiment of FIG. 4, about 80 degrees. This more abrupt exit angle may assist in retaining tools within holder and preventing accidental dislodging of tools.

When an object is pressed against tabs 20, 22 toward opening 24, one or both of arms 16, 18 may deflect outwards temporarily, expanding opening 24 to admit the tool past opening 24 and into holder 10. As the tool is pressed against tabs 20, 22, the user feels resistance, which may increase until the point at which there is sufficient clearance to permit passage of the tool. At that point, resistance may drop significantly or be eliminated, and the arms spring back to their original configuration. This positive feedback may alert the user that the tool has been placed within holder 10 and should not fall out unless the user takes active steps to do so.

Similarly, once the tool is located within holder 10, pulling the tool towards trailing surface 28 to remove it also may cause outward deflection of arms 16, 18. Once opening 24 has expanded to a size at least as large as the tool's diameter, holder 10 may permit passage of the tool out of opening 24. Because exit angle, $\ominus$, is less acute than entry angle, $\alpha$, the tool experiences a larger resistive force when attempting to be removed as compared to being inserted, which may reduce the possibility of accidental dislodgement.

Despite this repeated expansion and contraction, holder 10 preferably is made of a material with sufficient elasticity to resist permanent deformation and maintain opening 24 at substantially the same width after repeated usage, while also having sufficient rigidity to avoid deformation such as may be caused by loading of tools on holder. For example, holder 10 may be made of a material including, but not limited to, a metal such as steel sheet metal. Holder 10 may comprise a no-weld, one piece design, which may result in increased strength and durability for holder.

Different material gages or thicknesses may be employed depending on the size and/or desired holding strength of the holder, e.g., the one-tool holder of FIG. 3 may employ 20 gauge steel sheet metal, the two-tool holder of FIG. 2 may incorporate 16 gauge steel sheet metal, and the three-tool holder of FIG. 1 may employ 14 gauge steel sheet metal. These thicknesses may be interchangeable, or a different thickness may be used for one or more of the variations shown.

The gauges identified above, however, may be preferable, in that they may allow for a desired degree of elasticity within their respective hooks. This elasticity may be related to the amount of force needed to insert or remove objects from the hooks while, at the same time, providing sufficient strength to support a desired amount of weight and to resist permanent deformation.

Holder 10 may be configured to hold one or more objects in a generally fixed location. As such, arms 16, 18 may include one or more grooves 30 depending downward from an upper edge 32 of each arm. Grooves 30 may be substantially similarly shaped from arm to arm and along each arm. In one embodiment, as seen in FIG. 1, each groove 30 may be V-shaped, with a first groove surface 34 and second groove surface 36. FIGS. 2-3 illustrate embodiments with fewer grooves than the embodiment of FIG. 1 but also contain many similar features. Like features in the three figures have been given the same reference numerals, with a "prime" designation for the elements of FIG. 2 and a "double-prime" designation for the elements of FIG. 3.

For the sake of exemplary dimensions, groove surfaces 34, 36 may be between about ½" and about 3" long, preferably between about 1" and about 2" long, and in one embodiment, about 1⅜" long. Groove surfaces 34, 36 may be angled between about 60° and about 120° with respect to one another, preferably between about 75° and about 105°, and in one embodiment, about 90°.

In addition to first and second surfaces 34, 36, which may span a majority of groove 30, groove 30 further may include a third groove surface 38 and fourth groove surface 40 disposed between first and second surfaces, respectively, and upper edge 32, as seen in FIG. 1. Fourth surface 40, in particular, may be beneficial by functioning as an additional retention feature, forming a step for a tool to overcome, should it ever attempt to walk or slide out of groove 30. Third and fourth surfaces may be substantially normal to upper edge 32 and may have a length between about 0 inches and about 2 inches, preferably between about 0 inches and about ½ inches, still more preferably between about 1/16" and about ¼".

FIGS. 1 and 2 illustrate multi-groove versions of holder 10, 10'. Upper edge 32, 32' of each version of holder, and these versions in particular, may angle downward from base portion towards distal ends 17, 19 between about 0° and about 60° degrees, preferably between about 0° and about 45°, and in one embodiment, about 30°.

By angling upper edge 32 downward, grooves closer to base may be higher than those closer to distal end, which provides extra clearance room for heads of tools and/or improved visibility in order to locate tools.

V-shape may result in tool contacting groove 30 in at least two locations, e.g., one on each groove surface 34, 36, which may reduce tool wobble and result in increased stability for tools stored within grooves. This two-point contact may provide both vertical and horizontal constraint to the object being held, as compared to hooks with flat bars or substantially singular point of contact-type surfaces. In addition, while groove 30 is described in one embodiment as being V-shaped, groove 30 is not limited to this shape but instead may have any configuration that provides for the multi-directional constraint described above.

Additional stability may be realized by having the contact point on second groove surface 36 located below upper edge 32 such that, if the tool is inadvertently knocked, it will not leave groove 30 unless there is sufficient force in an upward direction to raise it above upper edge 32. Moreover, groove 30 may be angled forward and downward, preferably at about the same degree that upper edge 32 is angled, which may result in the tool being inclined to slide backward towards a bottom of groove 30, further helping to maintain the tool at a desired position within holder 10.

Groove 30 further may have a lining or lip 42, which may extend substantially along the length of groove. Lip 42 may cause groove 30 to be wider than a width of arm 16. Groove may be formed separately from, and may be coupled to, lip. For example, lip may comprise a molded plastic piece configured to fit around and press-fit onto groove.

A wider lip 42 may result in more stable holding of tool by increasing the surface area in contact with the tool, which also may reduce scratching or damage to tools. Lip 42 may have a width between about 1/32" and about ½", preferably about 3/16".

Turning now to FIG. 5, instead of being free-standing, holders 110 may be part of a holding system 100, configured to support one or more holders 110. Holders 110 may be similar to holders 10, such that reference numerals with 100s prefixes may be attributed to those features of holder 110 having similar reference numerals in holder 10 but without the 100s prefixes.

Holding system 100 may include a holder-mountable substrate 150, which may be considered a rail, panel, or other surface mountable to a wall and configured to support holders 110. For the sake of convenience, holder-mountable substrate may be referred to as a rail, such that use of the term rail shall be understood to include but not be limited to only a bar-type structure configured to hold holders in a side-by-side arrangement.

Rail 150 may be configured to receive one or more holders 110. As such, while holders may include openings configured to receive wood screws similar to openings 14 in holders 10, holders 110 preferably include protrusions 160 extending rearwardly from rear surface 113. Protrusions 160 may be configured to releasably couple holder 110 to rail 150. For example, protrusions may include a narrow portion 162 proximate rear surface 113 follows by a wider portion 164 extending from narrow portion 162. Preferably, holder 110 includes a plurality of protrusions 160. More preferably, holder 110 includes three protrusions 160.

Rail 150 may include openings 152 configured to receive protrusions 160. As seen in FIG. 5, openings 152 may be keyhole-type openings, having a narrow portion 154 and a wider portion 156. As such, wider portions 164 of protrusions may pass through wider portions 156 of openings, and holder 110 may be twisted or rotated so that narrow portions 162 of protrusions are received within narrow portions 154 of openings. This multi-opening mounting pattern or locking mechanism may allow for holder 110 to be mounted and fixed in all three axes, further contributing to increased stability of holder 110 on rail 150. As such, holder 110 may not be dislodged easily or inadvertently, particularly when impacted from below, which may maintain both holder 110 and any tools stored within holder 110 in place.

Protrusions and corresponding openings preferably are circumferentially spaced and may be substantially equally circumferentially spaced. Preferably, however, as seen in FIG. 7, protrusions and openings may be asymmetrically spaced, which may cause rail 150 to accept protrusions only if holder is in a certain, predetermined angular configuration, thereby helping to ensure that holder is oriented properly when installing in rail 150 and preventing holder from being installed in a non-upright or undesirable configuration. Additionally, openings 152 may be configured such that, when holder 110 is installed fully, a plurality of protrusions are disposed at or above contact portions on groove 130, increasing the downward shear component of loading on holder 110, generally, and on protrusions 160, specifically.

Similarly, protrusions/openings may be substantially equally radially spaced from a central point. Alternatively, openings may be located at different radial distances, which may serve one or more of the same functions as different circumferential spacing.

Staying with FIG. 7, holder 110 may include an additional protrusion 166, which may be centrally disposed between protrusions 160. Similarly, rail 150 may include an additional opening 158, as seen in FIG. 5, which also may be centrally disposed between openings 152. If protrusion 166 and opening 158 are centrally disposed, both may be substantially cylindrical or circular, such that rotation of holder 110 may result in rotation, but not translation, of protrusion 166. Protrusion 166 may extend rearward a greater distance than protrusions 160, which may assist in guiding holder 110 onto rail 150 and in guiding protrusions 160 toward the proper openings 152.

Although holding system 100 has been described with protrusions as part of holder 110 and openings as part of rail 150, it will be appreciated that the opposite is possible, as is a configuration that includes both protrusions and openings on each of holder 110 and rail 150.

Holder 110 may be similar to holder 10, in that it may include a plurality of arms 116, 118, each with a tab 120, 122 extending inward from their respective distal ends 117, 119. Holder 110 may include entry and exit angles similar to those of holder 10, and further may include grooves 130 similar to grooves 30 describe above.

Holder-mounting substrate or rail 150 may include a plurality of mounting positions 170. In one embodiment, as seen in FIG. 5, mounting positions 170 may be horizontally spaced, as well as being generally vertically aligned. Holders 110 installed on substrate 150 preferably are spaced far enough apart to provide clearance between objects mounted on holders; however, rail 150 may include additional mounting positions 170 between installed holders. For example, mounting positions 170 may be between about 2 inches and about 18 inches apart, preferably between about 2 inches and about 12 inches apart, and in one embodiment, a little more than about 3 inches apart.

Staying with FIG. 5, rail 150 may include at least one and preferably a plurality of flanges 172, preferably at a perimeter of rail 150. Flanges 172 may include a plurality of openings 174, which may be configured to receive fasteners such as wood screws to secure rail 150 to a wall. Openings on a first flange may be generally aligned with openings on a second flange.

Openings 174 may be spaced to align with studs or other supports behind the wall. For example, openings 174 may be spaced about 16 inches apart to coincide with studs that are 16 inches on center. Additionally or alternatively, openings 174 may be spaced some fraction or multiple of a base distance, e.g., half the base distance or about 8 inches apart, which may provide the user with increased flexibility in determining where to position rail 150.

In addition to flanges 172, rail 150 may include a base portion 173. Base portion 173 preferably is substantially planar. Base portion 173 also may extend outward from the wall and from flanges 172, such that there may be a gap between base portion and wall that is sized to receive protrusions 160 and preferably to leave clearance between protrusions 160 and the wall.

In addition to holders 110, holding system 100 also may include or be configured to receive various other types of holders. For example, FIGS. 5 and 8-9 illustrates a peg holder 210. Like holder 110, peg holder 210 may include a plurality of protrusions 260 extending rearward from rear surface 213 of base portion 212 and configured to releasably couple holder 210 to rail 150 via openings 152. As with holder 110, installing peg holder 210 may include the steps of inserting protrusion 260 into wider portion 156 of openings 152 and twisting peg holder 210 to locate narrow portion 262 of protrusions 260 within narrow portion 154 of openings 152, while wider portion 264 is positioned behind the rear surface of base portion 173.

Peg holder 210 further may include a shaft or other protrusion 250 extending forward from base portion 212. In one aspect, protrusion 205 may be substantially perpendicular to base portion 212 and/or rail 150. Alternatively, protrusion 250 may be otherwise angled, e.g., angle upwardly, which may help retain objects placed on peg holder 210.

Protrusion 250 may include a depression 252 along its length and preferably proximate its distal end 254. The depression maybe configured to point upwards when holder 210 is installed and further may serve as a retaining mechanism to assist in preventing items from sliding off holder 210.

Other types or variations of holders usable with rail 150 may be employed. These alternatives may be similar to holder 110 in that each of them may include a series of rearwardly-facing protrusions that may allow those holders to twistingly couple and decouple from rail 150.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A wall mountable holder, comprising:
   a base portion;
   a first arm and a second arm extending away from the base;
   each of the arms extending to a distal end spaced away from the base;
   each arm having an upper edge angled downward toward the distal end;
   each arm further including at least one groove extending downward from the upper edge, the at least one groove including a first surface and a second surface;
   a first tab proximate the distal end of the first arm and a second tab proximate the distal end of the second arm, the first and second tabs extending inward towards one another to form an opening;
   each tab including a leading face between an outer surface of a respective arm and the opening, and a trailing face between an inner surface of a respective arm and the opening;
   a lip extending along substantially all of at least one groove on each arm, each lip being wider than a thickness of its respective arm.

2. A wall mountable holder according to claim 1, wherein the at least one groove extending downward from the upper edge comprises: a plurality of grooves extending downward from the upper edge of each arm.

3. A wall mountable holder according to claim 1, wherein each groove is substantially V-shaped.

4. A wall mountable holder according to claim 1, wherein a plane extending perpendicularly away from the base portion forms a first angle with respect to the leading face and a second angle with respect to the trailing face;
   wherein the first angle is smaller than the second angle.

5. A wall mountable holder according to claim 1, wherein the first and second arms are configured to flex outward when an object contacts and moves past the first and second tabs.

6. A wall mountable holder according to claim 3, wherein each groove also has a retention step generally parallel to the base portion.

7. A wall mountable holder, comprising:

a base portion;

a first arm and a second arm extending outward from the base;

at least one opening on the base portion, the at least one opening configured to receive a mounting support for fixedly mounting the holder and disposed above the first and second arms;

an upper edge of each of the arms extending downward to a distal end spaced away from the base;

a tab extending inward to a location between the arms at a distal end of at least one of the arms, the tab including a leading surface angled inward and rearward from proximate the distal end, and a trailing surface angled outward and rearward from the leading surface;

a plurality of substantially similarly shaped grooves on each arm, each groove spanning an entire width of each arm, and each groove extending downwardly from the upper edge of each arm and having a retention step generally parallel to the base portion wherein each groove is substantially V-shaped and the V-shape is substantially covered by a lip wider than a thickness of its respective arm.

* * * * *